United States Patent
Park

(10) Patent No.: US 8,322,680 B2
(45) Date of Patent: Dec. 4, 2012

(54) EXHAUST SYSTEM HANGER OF VEHICLE

(75) Inventor: Kichul Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 289 days.

(21) Appl. No.: 12/913,523

(22) Filed: Oct. 27, 2010

(65) Prior Publication Data

US 2011/0108678 A1    May 12, 2011

(30) Foreign Application Priority Data

Nov. 10, 2009  (KR) .......... 10-2009-0107929

(51) Int. Cl.
*F16M 13/00* (2006.01)
(52) U.S. Cl. .......... 248/610; 248/617; 248/58; 180/309
(58) Field of Classification Search .......... 248/560, 248/605, 613, 617, 618, 610, 317, 611, 612, 248/568, 58, 60, 316
See application file for complete search history.

(56) References Cited

U.S. PATENT DOCUMENTS

| | | | |
|---|---|---|---|
| 4,380,324 A | 4/1983 | Woesler | |
| 6,402,119 B1 * | 6/2002 | Miska | 248/613 |
| 7,575,216 B2 * | 8/2009 | Zimmermann et al. | 248/610 |

FOREIGN PATENT DOCUMENTS

| | | |
|---|---|---|
| JP | 2002-371837 A | 12/2002 |
| KR | 10-0559656 B1 | 10/2006 |
| KR | 10-2007-0090591 A | 9/2007 |

* cited by examiner

*Primary Examiner* — Teri P. Luu
*Assistant Examiner* — Erin W Smith
(74) *Attorney, Agent, or Firm* — Morgan, Lewis & Bockius LLP

(57) ABSTRACT

The present invention relates to an exhaust system hanger of a vehicle, in which two protrusions facing and spaced apart from each other are integrally formed at a center portion between both distal ends of the hanger, and the two protrusions selectively contact each other to increase a spring constant, when the shape of the hanger is elastically deformed by external force beyond a predetermined elastic value.

14 Claims, 4 Drawing Sheets

EXHAUST SYSTEM HANGER OF VEHICLE

CROSS-REFERENCE TO RELATED APPLICATIONS

The present application claims priority to Korean Patent Application Number 10-2009-0107929 filed Nov. 10, 2009, the entire contents of which application is incorporated herein for all purposes by this reference.

BACKGROUND OF THE INVENTION

1. Field of the Invention

The present invention relates to an exhaust system hanger of a vehicle, in more detail the structure of a hanger supporting the muffler etc at the lower portion of a vehicle.

2. Description of Related Art

In general, the exhaust system of vehicles includes a muffler depressurizing high-temperature and high-pressure gas discharged from the engine to reduce noise and a catalytic converter purifying the exhaust gas, and is fixed by hangers at a plurality of positions at the lower portion of the car body.

The hangers are made of a material capable of providing elasticity, such as rubber, and of which one end is connected to the car body and the other end is connected to the exhaust system, such that they stably support the exhaust system, absorbing vibration of the exhaust system which is generated when the vehicle is in travel.

The vibration of the exhaust system can fall into a small vibration generated by combustion in the engine when the vehicle is in travel and large vibration caused by rapid stop or start of the vehicle. The hanger should have a low spring constant to effectively absorb the small vibration, whereas it should have a large spring constant to effectively absorb the large vibration.

Hangers generally used in the related art, however, cannot absorb both of the small vibration and the large vibration of the exhaust system, such that they cannot appropriately deal with the large vibration when being configured to absorb the small vibration of the exhaust system, and on the contrary, cannot absorb the small vibration when being configured to absorb the large vibration of the exhaust system. Accordingly, they reduce NVH performance of vehicles.

A configuration has been proposed in the related art to overcome the problems which is basically provided with hangers for absorbing small vibration of the exhaust system and additionally provided with a band at the outside such that the hangers absorb the small vibration, using their elastic force in normal traveling and the band appropriately attenuate the large vibration of the exhaust system.

However, adding the band to the hanger causes new problems, such as that the work processes and manufacturing cost increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an exhaust system hanger of a vehicle that makes it possible to achieve excellent NVH performance of the vehicle by effectively absorbing small vibration generated when the vehicle travels, without a specific additional component, and keeps the exhaust system stable by appropriately restricting the maximum motion of the exhaust system due to large vibration generated by abrupt changes in motion of the vehicle.

In an aspect of the present invention, the exhaust system hanger of a vehicle, may include a first connection hole and a second connection hole, a mid-hole disposed between the first and second connection holes and formed by bridges at both lateral sides of the hanger, a column protruding from an upper surface of the mid-hole toward the second connection hole with a predetermined length, a wing that protrudes from a distal end of the column toward the bridges, wherein an upper surface of the wing is indented, and locking portions protruding from a lower surface of the mid-hole toward the first connection hole and covering the wing with a predetermined gap, wherein the locking portions are spaced from the column with a predetermined gap, and wherein lower surfaces of the locking portions face the upper surface of the wing with a predetermined gap and are indented.

The wing may further have a lateral side that is indented and connected to the upper surface thereof, and the locking portion further may have a lower lateral side that is connected to the lower surface thereof and indented to face a lateral side of the wing with a predetermined gap.

The column may be indented at both lateral sides thereof and the locking portion further has an upper lateral side connected to the lower surface and indented to correspond to the lateral sides of the column, wherein the upper surface of the wing horizontally extends outside from the distal end of the column, wherein the lateral side of the wing perpendicularly extends from the upper surface thereof, and wherein the lower lateral side, the lower surface, and the upper lateral side of the locking portion are spaced in parallel from the lateral side and the upper surface of the wing and the both lateral sides of the column respectively.

In another aspect of the present invention, the exhaust system hanger of a vehicle, may include a first connection hole and a second connection hole, a mid-hole disposed between the first and second connection holes and formed by bridges at both lateral sides of the hanger, a column protruding from an upper surface of the mid-hole toward the second connection hole with a predetermined length, a wing that protrudes from a distal end of the column toward the bridges at both lateral sides of the hanger, wherein an upper inclined surface of the wing extends outside from a distal end of the column while inclining with a predetermined angle, and locking portions protruding from a lower surface of the mid-hole toward the first connection hole and covering the wing with a predetermined gap, wherein a lower inclined surface thereof facing the upper inclined surface of the wing is spaced apart in parallel while declining with a predetermined angle, wherein the wing further has a lateral side vertically extending from the upper inclined surface thereof, and wherein the locking portion further has a lower lateral side extending from the inclined lower surface thereof and spaced apart in parallel from the lateral side of the wing.

The upper inclined surface of the wing and the lower inclined surface of the locking portion may be indented slopes.

The lateral side of the wing and the lower lateral side of the locking portion may be indented, wherein the column is indented at both lateral sides thereof and the locking portion further has an upper lateral side connected to the lower inclined surface thereof and indented to correspond to the lateral side of the column.

In still another aspect of the present invention, two protrusions facing and spaced apart from each other may be integrally formed at a center portion between both distal ends of the hanger, and the two protrusions may selectively contact each other to increase a spring constant, when the shape of the hanger is elastically deformed by external force beyond a predetermined elastic value.

Connection holes may be connected to a car body and an exhaust system respectively are formed at the both ends of the hanger, a mid-hole is formed between the connection holes, the two protrusions are formed in the mid-hole, and the two protrusions includes one protrusion having a column protruding from an upper surface of the mid-hole toward the other end of the hanger and a wing protruding from a distal end of the column to both lateral sides of the mid-hole, and the other protrusion having locking portions protruding from a lower surface of the mid-hole toward the one end of the hanger and covering the wing with a predetermined distance therebetween.

The wing may have an upper inclined surface horizontally extending from the distal end of the column outside the column and a lateral side vertically extending from the upper inclined surface of the wing, and the locking portion may have a lower lateral side, a lower inclined surface, and an upper side spaced apart in parallel from the lateral side and the upper inclined surface and both lateral sides of the column.

The both lateral sides of the column and the upper inclined surface and both lateral sides of the wing may be indented, and the lower lateral side, the lower inclined surface, and the upper lateral side of the locking portion are indented.

The wing may have the upper inclined surface connected to the column and extending outside from the column while inclining, and a lateral side vertically extending from the upper inclined surface, and the locking portion may have the lower lateral side spaced apart in parallel from the lateral side of the wing, the lower inclined surface spaced apart in parallel from the upper inclined surface of the wing while declining, and the upper lateral side thereof spaced apart in parallel from both lateral sides of the column.

The both lateral sides of the column and the upper inclined surface and both lateral sides of the wing may be indented, and the lower lateral side, the lower inclined surface, and the upper lateral side of the locking portion may be indented.

An exhaust system hanger of a vehicle according to the present invention makes it possible to achieve excellent NVH performance of the vehicle by effectively absorbing small vibration generated when the vehicle travels, without a specific additional component, and keeps the exhaust system stable by appropriately restricting the maximum motion of the exhaust system due to large vibration generated by abrupt changes in motion of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
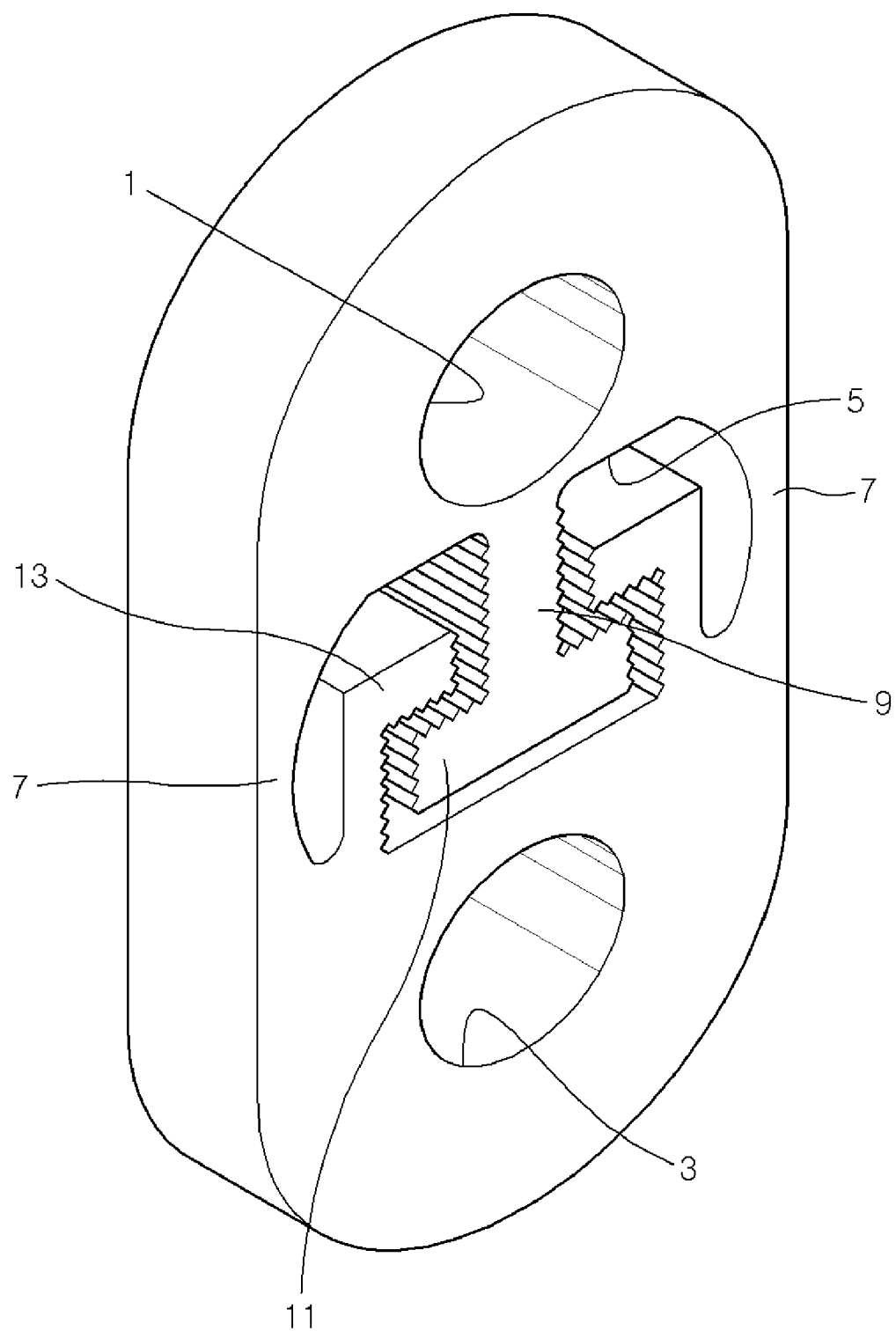
FIGS. 1 and 2 are a perspective view and a front view, respectively, of an exemplary hanger according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
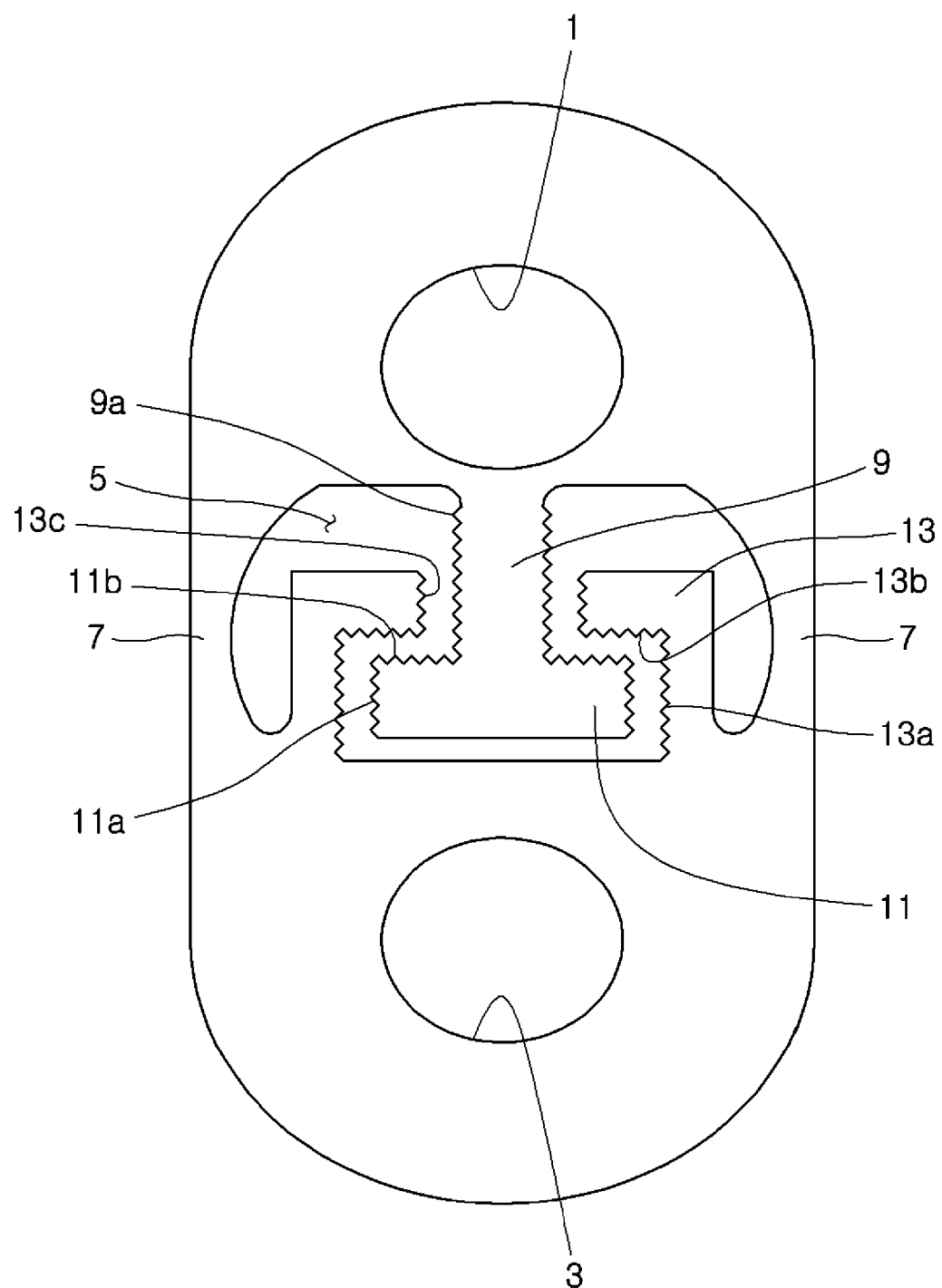

An exhaust system hanger according to a first embodiment of the present invention is shown in FIGS. 1 and 2.

As shown in the figures, a hanger according to a first embodiment of the present invention has connection holes 1 and 3 formed at both end portions to be connected with the car body and the exhaust system, a mid-hole 5 formed between the connection holes 1 and 3, and bridges 7 with both ends connected to both sides of mid-hole 5.

A column 9 protruding from an upper surface of the mid-hole 5 toward the second connection hole 3 is formed in the mid-hole 5 and wing 11 protruding toward bridges 7 is formed at both sides of the distal end of column 9.

Further, locking portions 13 protruding from a lower surface of the mid-hole 5 toward first connection hole 1 and covering the upper surface 11b and a lateral side 11a of wing 11 is formed in mid-hole 5.

That is, column 9 and wings 11 make an inverse T-shape and locking portions 13 covering both wings 11 at their sides are formed in a ┌-shape and a ┐-shape.

In this structure, column 9 and wings 11 are spaced from locking portions 13 and locking portions 13 are also spaced from bridges 7.

In the present embodiment the lateral side 11a and the upper surface 11b of wing 11 are indented and the lower lateral sides 13a and the lower surfaces 13b of locking portions 13 corresponding to lateral side 11a and upper surface 11b of wing 11, respectively, are also indented.

Further, in the present embodiment both lateral sides 9a of column 9 are indented and the upper lateral sides 13c of locking portions 13 which face both lateral sides 9a of column 9 are also indented.

The operation of the first embodiment of the present invention is described hereafter.

Any one of connection holes 1 and 3 of the hanger is connected to the car body and the other is connected to the exhaust system to support the exhaust system against the car body.

Small vibration is generated in the exhaust system, when the vehicle is stopped or normally travels. The small vibration in the exhaust system is absorbed and attenuated by extension and contraction of bridges 7.

Since the hangers are made of an elastic material having a spring constant allowing bridges 7 to effectively attenuate the vibration while expanding and contracting, small vibration of the exhaust system with respect to the car body which is generated when the vehicle normally travels, as described above, is effectively absorbed and reduced, such that it is possible to achieve high NVH performance of the vehicle.

When the relative motion of the exhaust system to the car body is abruptly increased by sudden changes in motion of the vehicle, the maximum motion of the hanger is restricted by interaction of column 9, wing 11, and locking portions 13, and as a result, it is possible to restrict large vibration of the exhaust system with respect to the car body.

That is, in the hanger shown in FIG. 2, when both end portion with connection holes 1 and 3 are excessive tensed in the up-down direction, the gap between lateral side 11a of wing 11 and lower lateral sides 13a of locking portion 13 and the gap between upper surface 11b of wing 11 and lower surfaces 13b of locking portion 13 are decreased, and as a result, lateral side 11a of wing 11 contact with lower lateral sides 13a of locking portion 13 and upper surface 11b of wing 11 contacts with lower surfaces 13b of locking portion 13, such that the hanger cannot be tensed any more in the up-down direction.

In this process, since lateral side 11a and upper surface 11b of wing 11 and lower lateral surfaces 13a and lower surfaces 13b of locking portion 13 are indented, friction force between wing 11 and locking portion 13 is significantly increased without sliding by engagement of the teeth on lateral side 11a and lower lateral surfaces 13a, and upper surface 11b and lower surfaces 13b, such that it is possible to effectively restrict large vibration of the exhaust system.

Further, since both lateral sides 9a of column 9 and upper lateral sides 13c of locking portions 13 are indented, friction force between column 9 and locking portions 13 are considerably increased without sliding by engagement of the teeth on both lateral sides 9a and upper surfaces 13c, such that it is possible to effectively restrict large vibration of the exhaust system.

Further, when large vibration narrows the gap between connection holes 1 and 3, in the hanger shown in FIG. 2, the ends of wing 11 contact with mid-hole 5 facing them, such that the gap between connection holes 1 and 3 is not narrowed any more. Accordingly, it is possible to effectively restrict large vibration of the exhaust system.

Further, the hanger is limited in side motion at a predetermined level by lateral side 11a of wing 11 and lower lateral sides 13a of locking portion 13.

The spring constant of the hanger changes, when the motion of the exhaust system with respect to the car body is limited by column 9, wing 11, and locking portions 13.

Therefore, small vibration of the exhaust system is effectively absorbed by bridges 7 of the hanger and the exhaust system can be continuously kept stable with respect to the car body by the restriction of motion by column 9, wing 11, and locking portions 13 and the change in spring constant, even in large vibration of the exhaust system.

Figure 3:
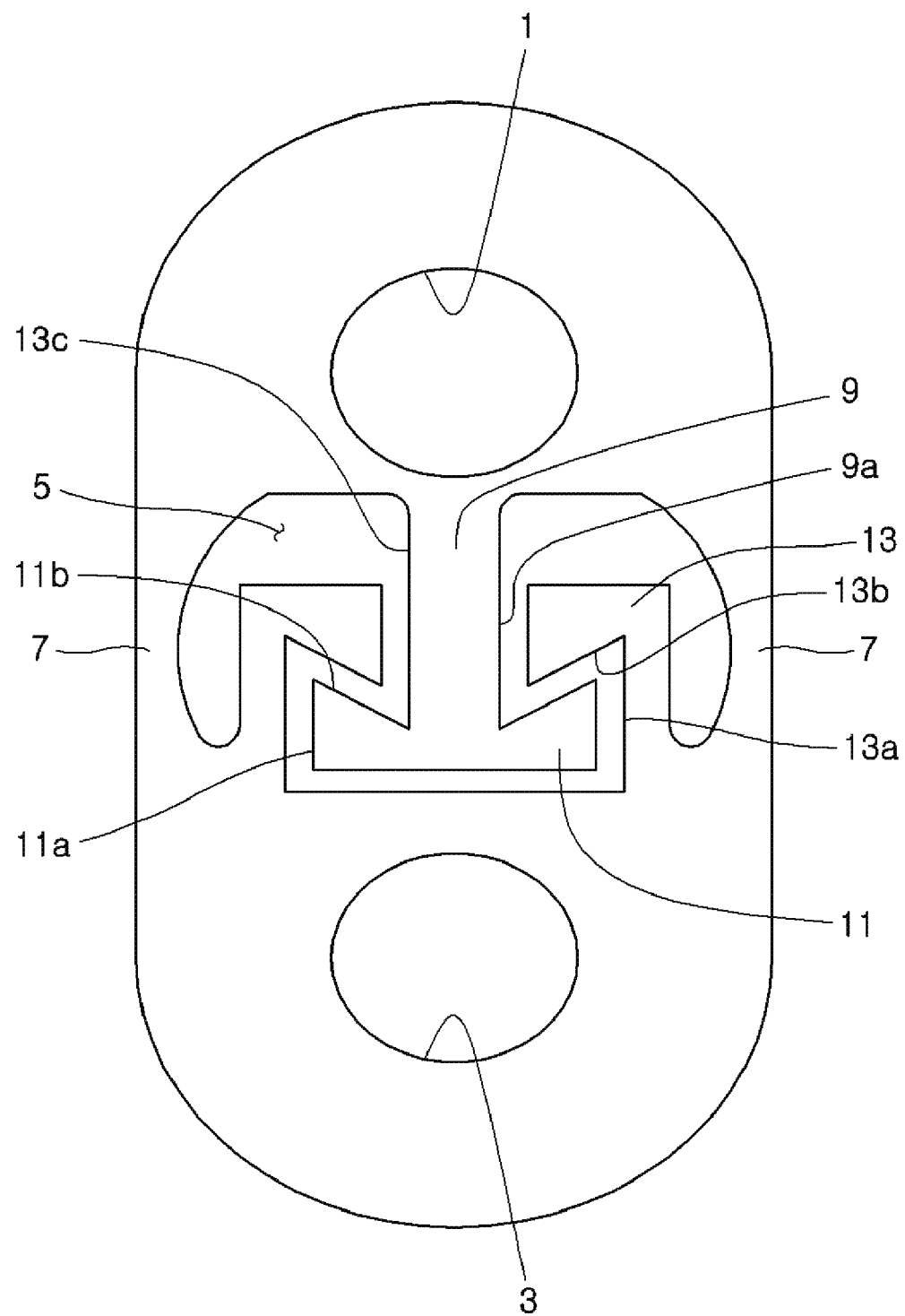
FIG. 3 is a front view of an exemplary hanger according to the present invention.

FIG. 3 shows a hanger according to a second embodiment of the present invention, which is different from the hanger shown in FIG. 2 in that the lateral side 11a and the upper inclined surface 11b of wing 11 are flat and the lower lateral sides 13a and the lower inclined surfaces 13b of locking portions 13 are flat in parallel with lateral side 11a and upper inclined surface 11b of wings 11, respectively. In particular, upper inclined surface 11b of wing 11 inclines toward lower inclined surfaces 13b of locking portions 13, and lower inclined surfaces 13b of locking portion 13 which face upper inclined surface 11b of wing 11 declines in parallel with upper inclined surface 11b of wing 11.

Therefore, upper inclined surface 11b of wing 11 contacts with lower inclined surfaces 13b of locking portions 13 in large vibration of the exhaust system and friction force therebetween considerably increases, such that the hanger according to the second embodiment of the present invention can effectively restrict the large vibration of the exhaust system, without sliding.

Figure 4:
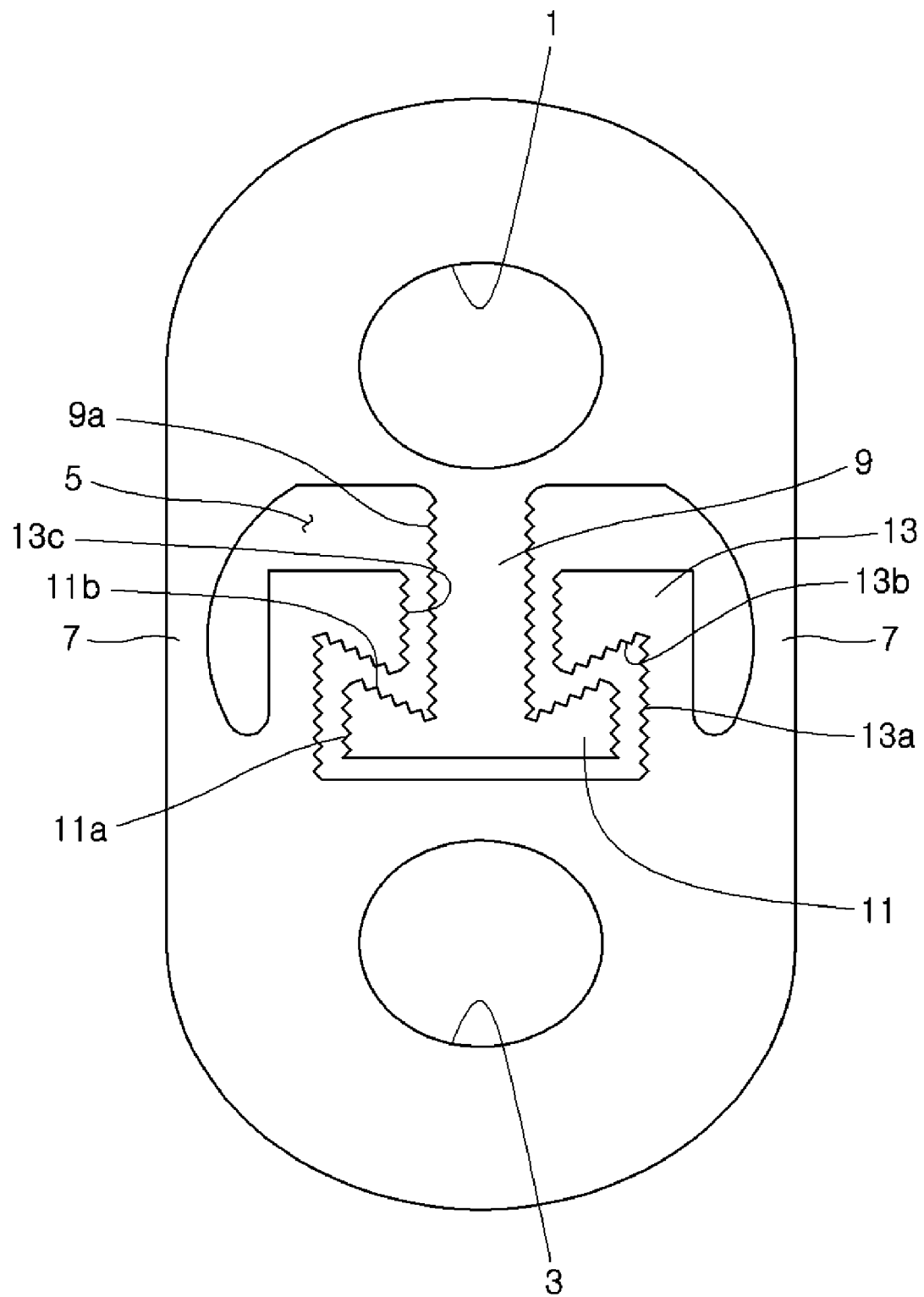
FIG. 4 is a front view of an exemplary hanger according to the present invention.

FIG. 4 shows a hanger according to a third embodiment of the present invention, which is different from the hanger shown in FIG. 3 in that the lateral side 11a and the upper inclined surface 11b of wing 11 are indented, and the corresponding lower lateral sides 13a and the lower inclined surfaces 13b of locking portions 13 are also indented.

Further, both lateral sides 9a of column 9 are also indented and the upper lateral sides 13c of locking portions 13 which face both lateral sides 9a of column 9 are also indented.

Upper inclined surface 11b of wing 11 and lower inclined surfaces 13b of locking portion 13 incline and decline, which is the same as the hanger shown in FIG. 3.

Therefore, as in the hanger shown in FIG. 2, since both lateral sides 11a and lower lateral sides 13a are engaged and upper inclined surface 11b and lower inclined surfaces 13b are engaged while both lateral sides 9a of column 9 and upper lateral sides 13c of locking portions 13 are engaged, friction forces between wing 11 and locking portions 13 and between column 9 and locking portions 13 are significantly increased by the engagement. Therefore, the hanger according to the third embodiment of the present invention can effectively restrict large vibration of the exhaust system, without sliding.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system hanger of a vehicle, comprising:
    a first connection hole and a second connection hole;
    a mid-hole disposed between the first and second connection holes and formed by bridges at both lateral sides of the hanger;
    a column protruding from an upper surface of the mid-hole toward the second connection hole with a predetermined length;
    a wing that protrudes from a distal end of the column toward the bridges, wherein an upper surface of the wing is indented; and
    a locking portion protruding from a lower surface of the mid-hole toward the first connection hole and covering the wing with a predetermined gap,
    wherein the locking portion is spaced from the column with a predetermined gap, and
    wherein a lower surface of the locking portion face the upper surface of the wing with a predetermined gap and is indented.

2. The exhaust system hanger of a vehicle as defined in claim 1,
    wherein the wing further has a lateral side that is indented and connected to the upper surface thereof, and wherein the locking portion further has a lower lateral side that is connected to the lower surface thereof and indented to face a lateral side of the wing with a predetermined gap.

3. The exhaust system hanger of a vehicle as defined in claim 2, wherein the column is indented at the lateral side thereof and the locking portion further has an upper lateral side connected to the lower surface and indented to correspond to the lateral side of the column.

4. The exhaust system hanger of a vehicle as defined in claim 3, wherein the upper surface of the wing horizontally extends outside from the distal end of the column, wherein the lateral side of the wing perpendicularly extends from the upper surface thereof, and wherein the lower lateral side, the lower surface, and the upper lateral side of the locking portion are spaced in parallel from the lateral side and the upper surface of the wing and the both lateral sides of the column respectively.

5. An exhaust system hanger of a vehicle, comprising:
a first connection hole and a second connection hole;
a mid-hole disposed between the first and second connection holes and formed by bridges at both lateral sides of the hanger;
a column protruding from an upper surface of the mid-hole toward the second connection hole with a predetermined length,
a wing that protrudes from a distal end of the column toward the bridges at both lateral sides of the hanger, wherein an upper inclined surface of the wing extends outside from a distal end of the column while inclining with a predetermined angle; and
a locking portion protruding from a lower surface of the mid-hole toward the first connection hole and covering the wing with a predetermined gap, wherein a lower inclined surface thereof facing the upper inclined surface of the wing is spaced apart in parallel while declining with a predetermined angle.

6. The exhaust system hanger of a vehicle as defined in claim 5,
wherein the wing further has a lateral side vertically extending from the upper inclined surface thereof, and
wherein the locking portion further has a lower lateral side extending from the inclined lower surface thereof and spaced apart in parallel from the lateral side of the wing.

7. The exhaust system hanger of a vehicle as defined in claim 6, wherein the upper inclined surface of the wing and the lower inclined surface of the locking portion are indented slopes.

8. The exhaust system hanger of a vehicle as defined in claim 7, wherein the lateral side of the wing and the lower lateral side of the locking portion are indented.

9. The exhaust system hanger of a vehicle as defined in claim 8, wherein the column is indented at both lateral sides thereof and the locking portion further has an upper lateral side connected to the lower inclined surface thereof and indented to correspond to the lateral side of the column.

10. An exhaust system hanger of a vehicle, wherein two protrusions facing and spaced apart from each other are integrally formed at a center portion between both distal ends of the hanger, and
the two protrusions selectively contact each other to increase a spring constant, when the shape of the hanger is elastically deformed by external force beyond a predetermined elastic value, wherein connection holes connected to a car body and an exhaust system respectively are formed at the both ends of the hanger, a mid-hole is formed between the connection holes, the two protrusions are formed in the mid-hole, and the two protrusions include one protrusion having a column protruding from an upper surface of the mid-hole toward the other end of the hanger and a wing protruding from a distal end of the column to both lateral sides of the mid-hole, and the other protrusion has a locking portion protruding from a lower surface of the mid-hole toward the one end of the hanger and covering the wing with a predetermined distance therebetween.

11. The exhaust system hanger of a vehicle as defined in claim 10, wherein the wing has an upper inclined surface horizontally extending from the distal end of the column outside the column and a lateral side vertically extending from the upper inclined surface of the wing, and the locking portion has a lower lateral side, a lower inclined surface, and an upper side spaced apart in parallel from the lateral side and the upper inclined surface and both lateral sides of the column.

12. The exhaust system hanger of a vehicle as defined in claim 11, wherein the both lateral sides of the column and the upper inclined surface and both lateral sides of the wing are indented, and
the lower lateral side, the lower inclined surface, and the upper lateral side of the locking portion are indented.

13. The exhaust system hanger of a vehicle as defined in claim 10, wherein the wing has the upper inclined surface connected to the column and extending outside from the column while inclining, and a lateral side vertically extending from the upper inclined surface, and the locking portion has the lower lateral side spaced apart in parallel from the lateral side of the wing, the lower inclined surface spaced apart in parallel from the upper inclined surface of the wing while declining, and the upper lateral side thereof spaced apart in parallel from both lateral sides of the column.

14. The exhaust system hanger of a vehicle as defined in claim 13, wherein the both lateral sides of the column and the upper inclined surface and both lateral sides of the wing are indented, and
the lower lateral side, the lower inclined surface, and the upper lateral side of the locking portion are indented.

* * * * *